United States Patent [19]

Payne et al.

[11] 4,282,578
[45] Aug. 4, 1981

[54] SYSTEM FOR LINEARIZING NON-LINEAR TRANSDUCER SIGNALS

[75] Inventors: F. Leland Payne; Jeffrey L. Taylor, both of Tucson, Ariz.

[73] Assignee: Burr-Brown Research Corporation, Tucson, Ariz.

[21] Appl. No.: 131,031

[22] Filed: Mar. 17, 1980

[51] Int. Cl.³ .......................................... G06F 15/353
[52] U.S. Cl. ..................................... 364/573; 364/723
[58] Field of Search ....................... 364/573, 577, 723; 340/347 NT

[56] References Cited

U.S. PATENT DOCUMENTS

| | | | |
|---|---|---|---|
| 3,686,665 | 8/1972 | Elias et al. | 340/347 NT X |
| 3,699,318 | 10/1972 | Vnderkoffler | 364/573 X |
| 3,790,910 | 2/1974 | McCormack | 364/573 X |
| 4,161,880 | 7/1974 | Prusky | 364/557 X |
| 4,231,097 | 10/1980 | Shibayama et al. | 364/577 |

Primary Examiner—David H. Malzahn
Attorney, Agent, or Firm—Cahill, Sutton & Thomas

[57] ABSTRACT

A system for linearizing non-linear transducer output signals includes an analog-to-digital converter having a plurality of digital outputs. A first group of the most significant bits of the analog-to-digital converter digital outputs are coupled to address inputs of a read only memory. The remaining digital outputs of the analog-to-digital converter are coupled to a first group of inputs of a digital multiplying circuit. A first group of data outputs of the read only memory are coupled to a first group of inputs of a summing circuit and represent intersection points of a piece-wise linear approximation to a mathematical curve representing the relationship between unlinearized data produced by the analog-to-digital converter and linearized data produced by the linearizing system. A second group of the read only memory data outputs are coupled to a second group of inputs of the digital multiplying circuit and represent the slopes of straight lines extending from one intersection point toward another. The digital multiplying circuit produces a product word, a predetermined number of bits of which are algebraically summed with the first group of read only memory data outputs. Since the carry bits are connected, the multiplier output is really summed with the entire first group.

10 Claims, 3 Drawing Figures

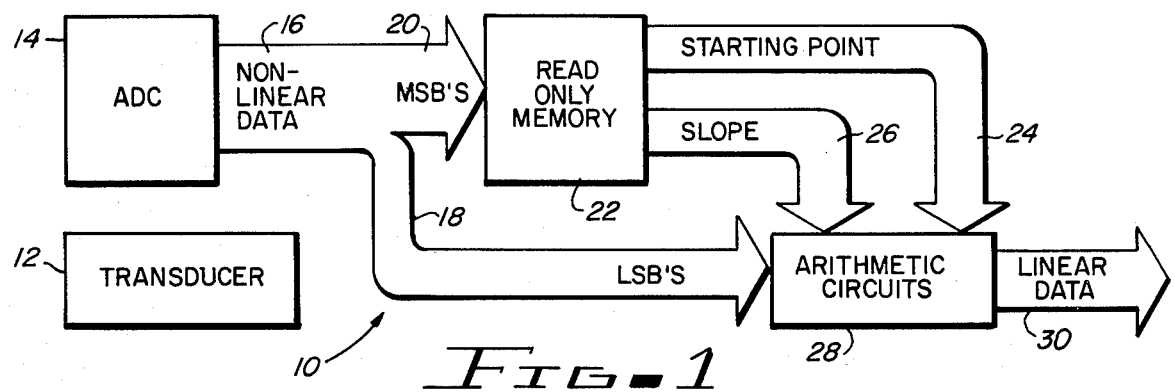
_FIG-1_
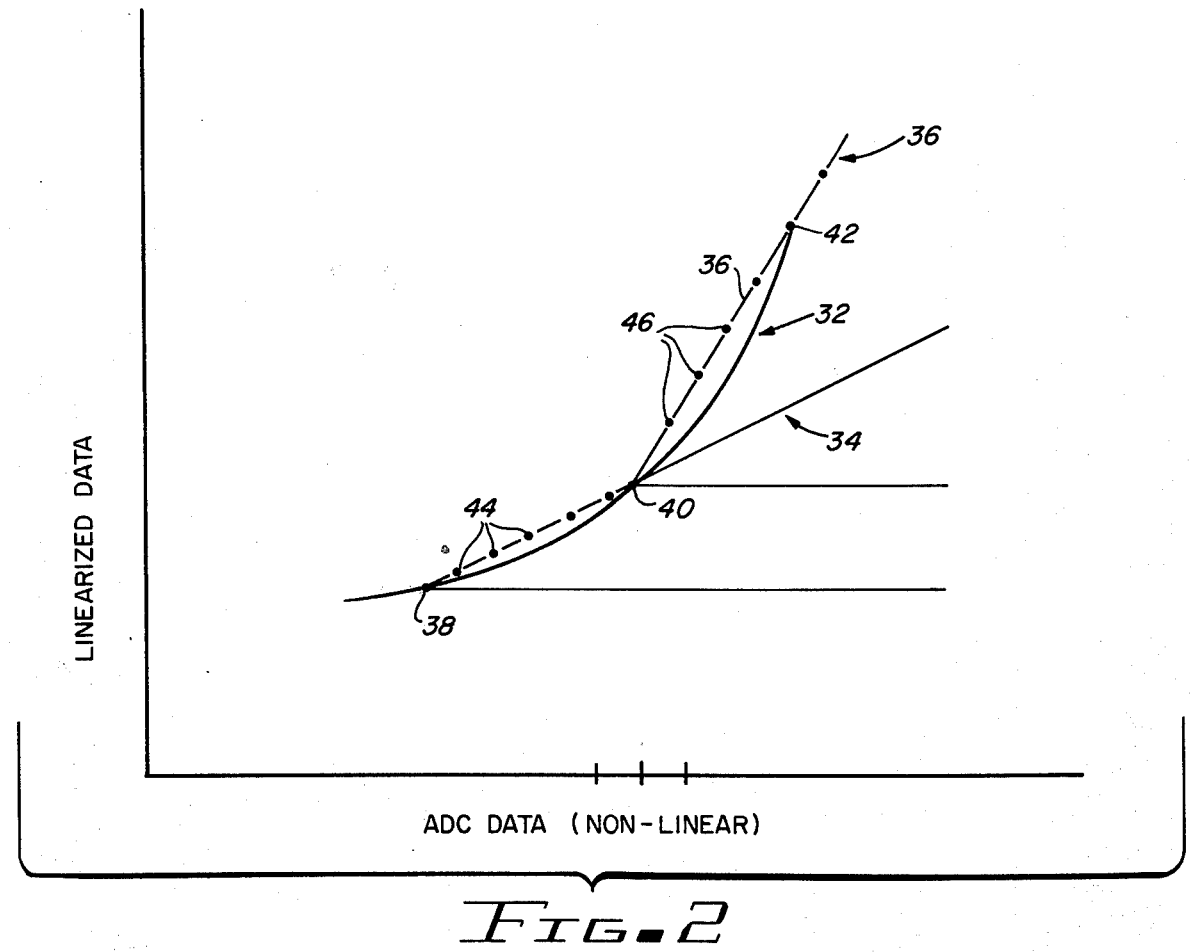
_FIG-2_

4,282,578

SYSTEM FOR LINEARIZING NON-LINEAR TRANSDUCER SIGNALS

BACKGROUND OF THE INVENTION

1. Field of the Invention

The invention relates to circuits and methods for linearizing a non-linear signal and producing a predetermined number of corresponding digital outputs each having a predetermined number of bits.

2. Description of the Prior Art

It is well known that many transducers, such as thermocouples, strain gauge bridges, and pressure sensors, and the like are non-linear. Typical control systems frequently include such transducers. Acquisition of data corresponding to the non-linear analog outputs of such transducers is frequently required in the course of operation of the control systems. The data is typically converted from analog form to digital form utilizing an analog-to-digital converter. Use of a high accuracy analog-to-digital converter, such as a 12 bit analog-to-digital converter, results in $2^{12}$ digital output words representing the parameter sensed by the transducer. This is an excessively large number of digital output numbers to store and process. Consequently, in a typical control system it is not practical to "store" each and every data point or to otherwise process each and every data number which can be produced by a high accuracy analog-to-digital converter in response to the non-linear transducer. The process of "linearization" of non-linear data involves selecting a predetermined number of the digital words produced by the analog-to-digital converter and computing or otherwise determining a piece-wise linear approximation of a mathematical curve representing the relationship between the non-linearized data, and the linearized data produced by a "linearizing" system.

Various prior methods of performing such "linearization" have consisted of using non-linear circuit elements or using microprocessors and associated software to perform the linearization function. Non-linear circuits are difficult to design and are generally characterized by low accuracy, instability, and unit-to-unit variation, or are very expensive. Software linearization is more accurate, but usually consumes excessive amounts of time and also requires the expense of incorporating a microprocessor system and developing suitable software therefor. The state of the art in the area of linearization of sensor signals is believed to be indicated by U.S. Pat. Nos. 4,161,880, 3,790,910, 3,662,163, 3,686,665, 3,699,318, 3,939,459, 3,979,745, 4,148,220 and 4,149,120.

Accordingly, it is an object of the invention to provide a low cost digital means of linearizing sensor signals or transducer signals encountered in typical control systems.

Another object of the invention is to provide a digital system and method for linearizing digital signals at sufficiently high speeds that the linearized data can be utilized in conventional successive approximation converter systems.

Still another object of the invention is to provide a linearization system and method which avoids the necessity of utilizing a processor or software in order to accomplish the linearization process.

Yet another object of the invention is to provide a high speed, low cost system and method for linearizing sensor signals with a high degree of accuracy.

A yet further object of the invention is to provide a system and method of linearizing transducer signals without requiring excessive amounts of data storage.

SUMMARY OF THE INVENTION

Briefly described, and in accordance with one embodiment thereof, a system and method for linearizing unlinearized data includes a memory, multiplying circuitry, and summing circuitry. In the described embodiment of the invention, unlinearized data is produced at the output of a 12 bit analog-to-digital converter in response to a non-linear transducer. The most significant 8 bits of the output of the analog-to-digital converter are inputted to address inputs of a read only memory. 256 sixteen bit words are stored in the read only memory and are addressable by means of the 256 combinations of the 8 most significant bits of the unlinearized data words produced by the analog-to-digital converter. 12 of the most significant bits of the read only memory are connected to inputs of a summing circuit and are intersection points of a piece-wise linear approximation to a mathematical curve representing the relationship between unlinearized data produced at the output of the analog-to-digital converter and linearized data produced by the linearizing system. The remaining 4 bits of each 16 bit word stored in the read only memory contain a slope code which represents the slope of a straight line extending from one intersection point of the piece-wise linear approximation curve toward the next intersection point thereof. The corresponding 4 outputs of the read only memory are coupled to conduct the slope code of the selected stored word to four inputs of the multiplying circuit. In the described embodiment of the invention, the multiplying circuit is implemented by means of a read only memory programmed to perform a four bit by four bit multiplying function. The 4 least significant bits of the analog-to-digital converter output are coupled to the remaining 4 inputs of the multiplying circuit and represent an increment of unlinearized data which is multiplied by the slope code to produce a product word. A predetermined number of the most significant bits of the product word are summed with the 12 most significant outputs of the read only memory by means of the summing circuit. The remaining least significant bits of the product word are utilized as the least significant bits of the output word produced by the linearizing system. The predetermined number of most significant bits of the product word are selected so that the straight line segments of the piece-wise linear approximation to the mathematical curve most nearly approximate the mathematical curve.

BRIEF DESCRIPTION OF THE DRAWINGS

FIG. 1 is a block diagram illustrating a system for linearizing non-linear transducer signals.

FIG. 2 is a graph useful in explaining the operation of the systems of FIGS. 1 and 3.

DESCRIPTION OF THE INVENTION

Figure 3:
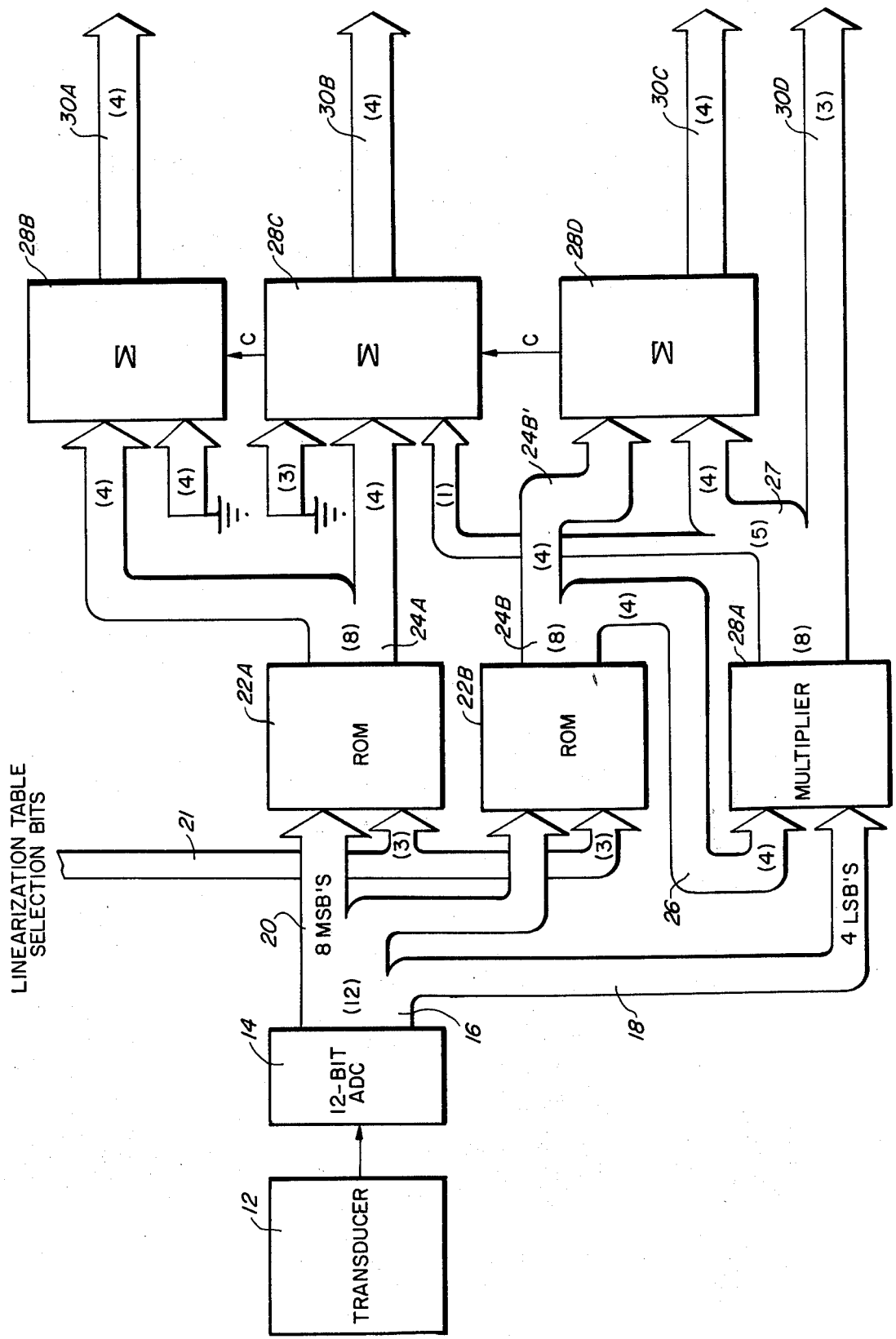
FIG. 3 is a detailed block diagram illustrating one embodiment of the invention.

Referring now to FIG. 1, linearizing system 10 includes non-linear sensor or transducer 12. Non-linear sensor 12 may be a thermocouple, thermister, semiconductor strain gauge or any of a variety of other transducers which produce an analog output which is a function of a parameter such as temperature, pressure, etc. The analog output of non-linear sensor 12 is connected to the analog input of analog-to-digital converter 14. Analog-to-digital converter 14 has a plurality of digital outputs which are connected to the respective conductors of a bus 16. The conductors of bus 16 are divided into two groups, including a group of most significant bits and the remaining bits referred to as least significant bits. The most significant bits of bus 16 are connected to the address inputs of read only memory 22 by means of bus 20. The least significant bits of bus 16 are connected by means of bus 18 to inputs of arithmetic circuitry shown in block 28. The data outputs of read only memory 22 are divided into two groups, the first group being connected to bus 24 and the second group being connected to bus 26. Respective conductors of buses 24 and 26 are connected to other inputs of arithmetic circuitry 28. The outputs of arithmetic circuitry 28 are connected to conductors of bus 30.

Each of the digital "words" produced at the digital outputs of analog-to-digital converter 14 represent non-linear data which constitutes a digital representation of a non-linear output voltage signal or current signal produced by non-linear sensor 12. As subsequently explained, each digital word produced on bus 24 represents an "intersection point" for a piece-wise linear approximation to a mathematical curve representing the relationship between "non-linearized" data on bus 16 and "linearized" data produced on bus 30 by linearizing system 10. Each digital word conducted by bus 26 corresponds to a slope of a straight line segment of the piece-wise linear approximation to the above mentioned mathematical curve.

The piece-wise linear approximation process can be best explained with reference to the graph of FIG. 2, wherein the vertical or Y axis represents "linearized data" produced on bus 30 of FIG. 1, and the X axis represents the "non-linearized" data produced on bus 16 by the digital outputs of analog-to-digital converter 14.

In FIG. 2, reference numeral 32 represents a nonlinear curve which represents the relationship between linearized data appearing on bus 30 and non-linearized data appearing on bus 16. Three different "starting points" or "intersection points" appearing on bus 24 of FIG. 1 are represented by reference numerals 38, 40 and 42 of FIG. 2; these points are referred to as "intersection points" because they are points at which the straight lines 34 and 36 intersect curve 32. The segment of line 34 located between intersection points 38 and 40 and the segment of lines 36 located between intersection points 40 and 42 constitute a "piece-wise linear approximation" to the portion of curve 32 located between intersection points 38 and 42. Straight line 34 is drawn through starting points 38 and 40 and straight line 36 is drawn through starting points 40 and 42.

In accordance with the present invention, the circuit of FIG. 1 computes the slope of line 34, and determines incremental quantities to be added to the value of intersection point 38 to produce a plurality of spaced points 44 lying along line 34. Similarly, points 46, which lie along straight line 36, are computed from the slope of line 36 and the value of intersection point 40.

This avoids the necessity of utilizing a read only memory 22 large enough to store all possible combinations of the signals produced at the outputs of analog-to-digital converter 14.

Referring now to FIG. 3, a practical implementation of the circuit shown in FIG. 1 is described. In FIG. 3, linearizing circuit 10' is described utilizing reference numerals which correspond to those designating corresponding parts in FIG. 1. In FIG. 3, analog-to-digital converter 14 is a 12 bit device which can be any of a variety of commercially available analog-to-digital converters available from the present assignee and various other manufacturers. The most significant 8 bits of bus 16 are connected to the address inputs of two 2048 word by 8 bit read only memories 22A and 22B. Three of the address inputs of read only memories 22A and 22B are connected to three additional conductors designated by reference numeral 21. The 8 most significant output bits of analog-to-digital converter 14 operate to select one of 256 words in the composite read only memory formed by read only memories 22A and 22B, hereinafter referred to as read only memory 22A, 22B. The three additional address inputs connected to conductors 21 are utilized to select one of eight 256 byte "tables" of data stored in each of read only memories 22A and 22B, and are referred to as "table selection bits." Thus, the read only memory 22A, 22B can store linearization "tables" for 8 different transducers. Read only memories 22A and 22B can each be implemented by means of 2048 word by 8 bit Model 2316 MOS read only memories manufactured by Intel Corporation.

The 4 least significant bits of bus 16 are connected to four address inputs of read only memory designated by reference numeral 28A. Read only memory 28A, hereinafter referred to as multiplier 28A, is pre-programmed to function as a four bit by four bit digital multiplier, and can be implemented by means of a Model 74S274 integrated circuit read only memory, manufactured by various semiconductor companies. Each multiplication product produced by multiplier 28A is an eight bit word, referred to as a "product word."

Four of the eight outputs of read only memory 22A are connected to four respective inputs of adder circuit 28B, the other four outputs of read only memory 22A being connected to four respective inputs of adder circuit 28C. Four of the outputs of read only memory 22B are connected to our respective inputs of adder circuit 28D. The remaining four outputs of read only memory 22B are connected by means of bus 26 to four additional address inputs of read only memory 28A. The five most significant data outputs of multiplier 28A are connected to the other inputs of four bit adders 28C and 28D, the remaining three least significant data outputs of multiplier 28A being utilized as the least significant output bits of linearizing system 10'. The four outputs of four bit adder 28B are utilized as the most significant four bits of data linearizing system 10', the four outputs 30B of adder 28C being used as the second four most significant bits of linearizing system 10'. Similarly, the four outputs 30C of adder 28D are utilized as the next four most significant output bits of linearizing system 10'. Adders 28B, 28C and 28D can be implemented by 74LS283 adders, which are readily commercially available.

Each of the eight above mentioned linearization tables stored in the composite read only memory 22A, 22B contains 256 sixteen bit words. Each such sixteen bit word is selected or addressed by a respective one of the 256 combinations of the eight bit word conducted by means of bus 20. Twelve of the sixteen bits of each in composite read only memory 22A, 22B represent an intersection point corresponding to the eight bit word applied to bus 20 to select that stored sixteen bit word.

The four remaining bits of each sixteen bit word stored in read only memory 22B contain one of sixteen possible different binary numbers which correspond to possible slope values which can be assigned to piece-wise linear segment lines, such as 34 and 36 in FIG. 2. The product word output of multiplier 28A is an eight bit word which results from multiplying the four bit word on bus 26 by the four bit word on bus 18.

For the purpose of explaining the operation of linearizing system 10', the four bits of bus 18 represent a quantity which can be thought of as representing an incremental variation in an unlinearized data variable X, and is referred to as $\Delta X$. The eight bits produced at the output of multiplying circuit 28A can be thought of representing an incremental variation in a linearized data variable Y, and is referred to as $\Delta Y$. Thus, additional points, such as 44 and 46 in FIG. 2, can be computed for additional values of the output of analog-to-digital converter 14 by adding the quantity $\Delta Y$ to the preceding intersection point, referred to as $Y'$. The value of any of the points along the piece-wise linear approximation to curve 32 in FIG. 2 can be thought of as being computed in accordance with the formula $Y = Y' + \Delta Y$, wherein $\Delta Y$ is computed as explained above by means of multiplier 28A and the addition is performed by the adder circuit including four bit adders 28B, 28C and 28D.

The number of bits on bus 18 which are added to the least significant bits of the starting point $Y'$ determine the "weight" accorded to the multiplier circuit 28A. This is best determined on a trial and error basis involving the procedure of superimposing the digital numbers produced on bus 30A–30D onto an actual graph, such as the one shown in FIG. 2, for different numbers of bits of bus 30D being inputted to adders 28C and 28D and selecting the number of bits for bus 27 which produces the most accurate piece-wise linear representation of the curve 32.

It should be appreciated that the four bits conducted by bus 26 are capable of selecting only sixteen different slopes. Consequently, the slope lines such as 34 and 36 shown in FIG. 2, actually only pass through their respective starting points such as 38 and 40. The one of the sixteen possible slopes selected is the one which causes the corresponding slope line to most nearly pass through the succeeding starting point.

Following is a hypothetical example explaining how the above mentioned sixteen bit words can be computed for entry into composite read only memory 22A, 22B of FIG. 3. First, assume that a mythical transducer is characterized by the equation OUTPUT=INPUT$^2$. Also assume that if the output voltage of the transducer is 10 volts, the output of analog-to-digital converter 14 has the value 4095$_D$. (Hereinafter, the subscript "D" will indicate that a particular number is a decimal number. "H" will be utilized as a subscript to indicate that a number is a hexadecimal number. "B" will be used as a subscript to indicate that a number is a binary number.)

In this example, three sample points or values of unlinearized data are selected. The values are values of decimal numbers between zero and 4095 produced at the output of analog-to-digital converter 14. The selected sample values are chosen to be 384$_D$, 400$_D$ and 416$_D$. Only the eight most significant bits of the binary representation of each of these numbers are conducted along bus 20 to the address inputs of the read only memory 22A, 22B. The four last significant bits of the selected numbers are conducted along bus 18 and represent the above mentioned $\Delta Y$ variable. The binary representation of the three selected numbers are given by 000110000000, 000110010000, and 000110100000, respectively. It can be seen readily that the most significant 8 bits of each of the above three binary numbers correspond to read only memory address locations 24$_D$, 25$_D$ and 26$_D$, respectively. Thus, we now know the read only memory location of the three sample points. We now must compute the data to put in each of the three corresponding sixteen bit locations of read only memory 22A, 22B. The following computation produces the three corresponding intersection points which correspond to the values of $Y'$ in the above mentioned equation:

OUTPUT$_1$ = INPUT$_1^2$ = 384$^2$/4096 = 36.01
OUTPUT = 384$^2$/4095 = 36.01
OUTPUT$_2$ = 400$^2$/4095 = 39.07
OUTPUT$_3$ = 416$^2$/4095 = 42.26

Thus, the first most significant twelve bits of each of the three sixteen bit words stored in read only memory locations 24$_D$, 25$_D$ and 26$_D$ have been determined. After they are converted to binary numbers, they can be programmed into those respective locations of read only memory 22A, 22B. Next, it is necessary to compute the remaining four bits corresponding to the slopes of the piece-wise linear approximation segments extending from each of the selected three intersection points toward the next intersection point. The four remaining bits of each 16 bit word stored in read only memory 22A, 22B has sixteen possible binary combinations, which are shown in the left column of Table 1 shown below.

TABLE 1

| SLOPE CODE | SLOPE IF ALL BITS USED | SLOPE IF 5 BITS USED |
|---|---|---|
| 0000 | 0 | 0 |
| 0001 | 1 | .13 |
| 0010 | 2 | .25 |
| 0011 | 3 | .38 |
| 0100 | 4 | .50 |
| 0101 | 5 | .63 |
| 0110 | 6 | .75 |
| 0111 | 7 | .88 |
| 1000 | 8 | 1.00 |
| 1001 | 9 | 1.13 |
| 1010 | 10 | 1.25 |
| 1011 | 11 | 1.38 |
| 1100 | 12 | 1.50 |
| 1101 | 13 | 1.63 |
| 1110 | 14 | 1.75 |
| 1111 | 15 | 1.88 |

Table 1 includes three columns, the middle column indicating the possible slopes of a piece-wise linear line segment if all eight bits outputted by multiplier circuit 28A are added to the least significant eight bits of the corresponding twelve bit intersection point computed above. The right hand table represents the slope of the piece-wise linear segment if only five bits of the output of multiplier 28A are added to the five least most significant bits of the corresponding twelve bit intersection point. Additional columns can be provided to obtain different ranges of slopes for different numbers of bits being inputted to the composite adder circuit including adder circuits 28B–D.

The desired slope code can be selected by using Table 1 if the desired slopes are computed. For example, the slope of the line extending from the first intersection point to the second is $(39.07-36.01)/(400-382)=0.19$. Similarly, the slope of a line extending from the second starting point to the third starting point is 0.20. Thus, by referring to Table 1, it is seen that in each case the closest slope code is 0001. The binary number 0001 should be written into the four least significant bits of the sixteen bit words stored in read only memory locations $24_D$ and $25_D$.

The foregoing technique can be utilized to determine the binary sixteen bit numbers to be written into each of the 256 words of each table in the above mentioned composite read only memory. Of course, if a mathematical expression is not available to enable the desired output to be computed, then emperical graph data can be utilized While the invention has been described with reference to a particular embodiment thereof, those skilled in the art will recognize that variations in the described embodiment of the invention can be made without departing from the true spirit and scope of the invention, as set forth in the appended claims.

We claim:

1. A system for linearizing unlinearized data in the form of a plurality of unlinearized data words, including a first unlinearized data word, to product linearized data in the form of a plurality of linearized data words, said first unlinearized data word including first and second groups of bits, said system comprising in combination:
   a. memory means for storing a plurality of words, including a first stored word, said first stored word including first and second groups of bits, said memory means being responsive to said first group of bits of said first unlinearized data word to effect accessing of said first stored word;
   b. multiplier means for multiplying said second group of bits of said first unlinearized data word by said second group of bits of said first stored word to produce a first product word; and
   c. summing means for algebraically summing a predetermined number of bits of said first product word with said first group of bits of said first stored word to produce a first one of said linearized data words.

2. The system of claim 1 wherein said first group of bits of said first stored word includes 12 bits, said second group of bits of said first stored word includes 4 bits, said first group of bits of said first unlinearized word includes 8 bits, said second group of bits of said first unlinearized word includes 4 bits, and said predetermined number of bits of said first product word is 5, said 5 bits being the most significant 5 bits of said first product word, said first 5 bits being added to the least significant 5 bits of said first group of bits of said first stored word by means of said summing means.

3. The system of claim 1 wherein a relationship between said plurality of unlinearized data words and said plurality of linearized data words can be represented by a mathematical curve plotted along a vertical axis representing linearized data and a horizontal axis representing unlinearized data and wherein each of said plurality of stored words represents a separate point on said mathematical curve, and wherein said second group of bits of said first stored word represents a slope code corresponding to the slope of a line drawn from a first point of said mathematical curve corresponding to said first stored word toward a second point of said mathematical curve corresponding to a second one of said stored words.

4. The system of claim 1 wherein each of said stored words has a greater number of bits than each of said unlinearized data words.

5. The system of claim 1 wherein said unlinearized data words are produced by an analog-to-digital converter in response to an analog signal produced by a non-linear transducer.

6. The system of claim 1 wherein said memory means includes a read only memory, said multiplier means includes a read only memory programmed to perform a multiplying function, and said summing means includes an adder circuit.

7. A method of linearizing data in the form of a plurality of unlinearized data words, including a first unlinearized data word, to produce linearized data in the form of a plurality of linearized data words, said first unlinearized data word including first and second groups of bits, said method comprising the steps of:
   storing a plurality of words, including a first stored word, in a memory, said first stored word including first and second groups of bits, said first stored word being stored in a location of the memory addressable by means of said first group of bits of said first unlinearized data word;
   multiplying said second group of bits of said first unlinearized data word by said second group of bits of said first stored word to produce a first product word; and
   algebraically summing a predetermined number of bits of said first product word with said first group of bits of said first stored word to produce a first one of said linearized data words.

8. The method of claim 7 wherein a relationship between said plurality of unlinearized data and said linearized data can be represented by a mathematical curve plotted along a vertical axis representing data and wherein each of said plurality of stored words represents a separate point on said mathematical curve, and wherein said second group of bits of said first stored word represents a slope code corresponding to the slope of a line drawn from a first point of said mathematical curve corresponding to said first stored word toward a second point of said mathematical curve corresponding to a second one of said stored words.

9. The method of claim 8 comprising the step of producing said plurality of unlinearized data words in response to a non-linear analog signal by means of an analog-to-digital converter.

10. The method of claim 8 wherein said predetermined number of bits of said product word is selected so that said line passes as closely as possible to said second point.

* * * * *